(12) United States Patent
Chenoweth (10) Patent No.: US 8,196,625 B1
(45) Date of Patent: Jun. 12, 2012

(54) SUPPLEMENTAL TREAD TIRE BEAD LOCK

(76) Inventor: Brant Chenoweth, Siloam Springs, AR (US)

( * ) Notice: Subject to any disclaimer, the term of this patent is extended or adjusted under 35 U.S.C. 154(b) by 0 days.

(21) Appl. No.: 13/068,109

(22) Filed: May 2, 2011

Related U.S. Application Data (63) Continuation of application No. 12/658,871, filed on Feb. 16, 2010, now abandoned, which is a continuation-in-part of application No. 11/891,047, filed on Aug. 8, 2007, now abandoned.

(60) Provisional application No. 60/836,482, filed on Aug. 8, 2006.

(51) Int. Cl.
*B60B 7/01* (2006.01)
*B60B 25/08* (2006.01)
*B60C 13/04* (2006.01)

(52) U.S. Cl. ............ 152/186; 152/379.3; 152/375; 152/406

(58) Field of Classification Search ............ 152/185, 152/186, 375, 379.3, 379.4, 379.5, 380, 381.4, 152/381.5, 381.6, 382, 383, 385, 387, 388, 152/389, 390, 391, 395, 397, 398, 405, 406, 152/516, 520; 301/37.24
See application file for complete search history.

(56) References Cited

U.S. PATENT DOCUMENTS

| 1,041,567 | A |   | 10/1912 | Ashton |         |
|-----------|---|---|---------|--------|---------|
| 1,965,058 | A |   | 7/1934  | Seabra | 301/39  |
| 2,017,891 | A |   | 10/1935 | Briggs | 152/14  |
| 2,145,525 | A |   | 1/1939  | Pedro  | 301/39  |
| 2,249,568 | A |   | 7/1941  | Shinliver | 152/405 |
| 2,410,209 | A |   | 10/1946 | Godsey | 152/330 |
| 2,868,262 | A |   | 1/1959  | Straussler | 152/401 |
| 3,065,995 | A |   | 11/1962 | Beacher | 301/39 |
| 3,381,737 | A |   | 5/1968  | Johnson | 152/391 |
| 4,142,569 | A |   | 3/1979  | Walther et al. | 152/409 |
| 4,168,732 | A |   | 9/1979  | Monzini | 152/353 |
| 4,206,797 | A |   | 6/1980  | Holland, Sr. | 152/353 |
| 4,235,271 | A |   | 11/1980 | Olsen et al. | 152/186 |
| 4,252,169 | A | * | 2/1981  | Watts | 152/186 |
| 4,619,302 | A |   | 10/1986 | Mellor | 152/398 |
| 5,000,518 | A |   | 3/1991  | Markow | 301/39 |
| 5,271,443 | A |   | 12/1993 | Boni et al. | 152/400 |
| 2007/0261774 | A1 | * | 11/2007 | Re Fiorentin et al. | 152/454 |

FOREIGN PATENT DOCUMENTS

WO WO 8901878 A1 * 3/1989

* cited by examiner

*Primary Examiner* — Kip T Kotter
(74) *Attorney, Agent, or Firm* — Keisling & Pieper PLC; David B. Pieper (57) ABSTRACT

A bead lock tire rim with a supplemental tread on the bead lock to protect the rim and the bolts. The tread extends past the edge of the rim to keep the tire from being split and the side area of the supplemental tread protects the bead lock while providing enhanced traction to the sidewall of the rim. A rim using a rounded projection to eliminate tire cutting and recessed nut locations with secure faceting is also provided for simple field repairs and long term durability.

9 Claims, 10 Drawing Sheets

SUPPLEMENTAL TREAD TIRE BEAD LOCK

CROSS-REFERENCE TO RELATED APPLICATIONS

This application hereby claims priority to and is a continuation of U.S. application Ser. No. 12/658,871, filed Feb. 16, 2010, now abandoned which is a continuation-in-part of U.S. application Ser. No. 11/891,047, filed Aug. 8, 2007, now abandoned which is a continuation-in-part of U.S. provisional application Ser. No. 60/836,482, filed Aug. 8, 2006, each of which is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the field of bead lock rims for tires. In particular, the present invention relates specifically to a particular design for a bead lock rim using a supplemental tread for protecting the bead lock, bolts, tire, and rim.

2. Description of the Known Art

As will be appreciated by those skilled in the art, wheel systems and other devices for tires have been the subject of many advances. Classes and subclasses for these types of devices may include: Class 152, Resilient tires and wheels, Subclass 173, 186, 387, 395, 397, 398, 516, 520; Class 301, Land vehicles: wheels and axles, Subclass 39.1, and 40.2. Patents disclosing information relevant to wheel systems include U.S. Pat. No. 1,965,058, issued to Seabra on Jul. 3, 1934; U.S. Pat. No. 2,017,891, issued to Briggs on Oct. 22, 1935; U.S. Pat. No. 2,410,209, issued to Godsey on Oct. 29, 1946; U.S. Pat. No. 3,065,995, issued to Beacher on Nov. 27, 1962; U.S. Pat. No. 3,381,737, issued to Johnson on May 7, 1968; U.S. Pat. No. 4,142,569, issued to Walther on Mar. 6, 1979; U.S. Pat. No. 4,206,797, issued to Holland on Jun. 10, 1980; U.S. Pat. No. 4,235,271, issued to Olsen on Nov. 25, 1980; U.S. Pat. No. 4,619,302, issued to Mellor on Oct. 28, 1986; U.S. Pat. No. 5,000,518, issued to Markow on Mar. 19, 1991; and U.S. Pat. No. 5,271,443, issued to Boni on Dec. 21, 1993. Each of these patents are hereby expressly incorporated by reference in their entirety.

Figure 2:
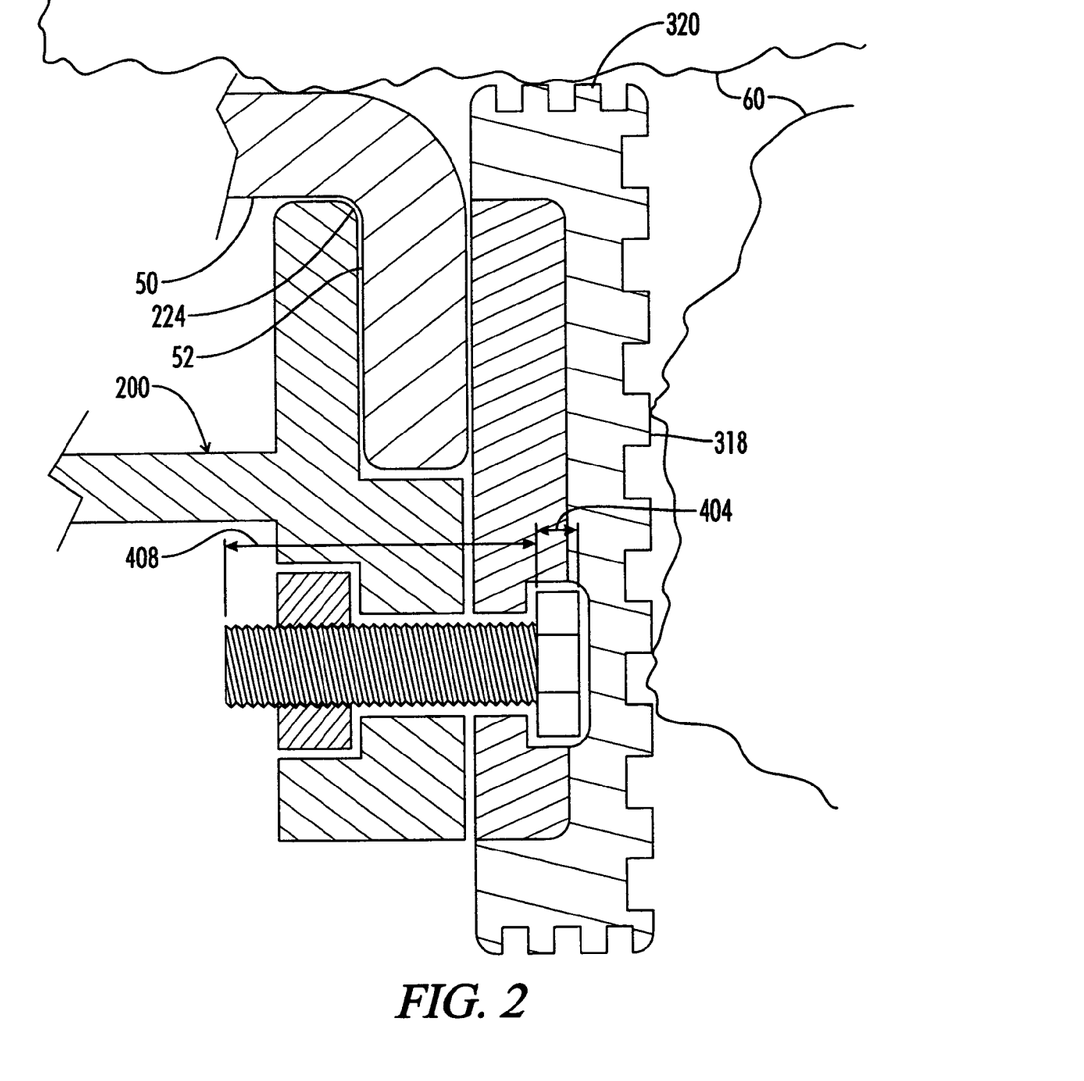
FIG. 2 is a cut away view of the rim, tire, and beadlock assembly showing the tire bend over the rim.

U.S. Pat. No. 3,065,995 issued to Beacher on Nov. 27, 1962 discloses a continuous, generally annular-shaped plate element extending around the wheel and lying closely adjacent to the side wall 30 of the tire engaged on the wheel rim 20, as shown in FIG. 2. Secured on the outer peripheral edges of the segments 24, 24 are respective enlarged beads or strips 31 of resilient deformable material, such as rubber.

U.S. Pat. No. 4,142,569 issued to Walther on Mar. 6, 1979 discloses a two-piece rim for mounting tires, single or dual, on a wheel. The removable bead ring has an axial projection intended for engagement by restraining means mounted on the wheel in the event a tire on said rim is unintentionally deflated. Various forms of restraining means are provided.

U.S. Pat. No. 4,235,271 issued to Olsen on Nov. 25, 1980 discloses a removable resilient shield is maintained proximate the sidewall of a tire for off-the-road vehicles to protect this critical area of the tire from damage due to contact with external objects such as rocks. The shield is secured to the terminal portion of the rim flange. The radially inner portion of the shield is spaced axially of the rim and at least one radially extending passage is provided for removal of debris from between the shield and the sidewall of a tire mounted on the rim.

Thus, it may be seen that these prior art patents are very limited in their teaching and utilization, and an improved rim and bead lock assembly with supplemental tread is needed to overcome these limitations.

SUMMARY OF THE INVENTION

The present invention is directed to an improved wheel rim and bead lock. In accordance with one exemplary embodiment of the present invention, a revised rim configuration is provided using recessed nut apertures for easy field replacement along with a rounded wheel support end to eliminate sidewall cutting during extreme use of the wheel at low pressure. Of particular note is the use of supplemental tread on the outside and ends of the bead lock for protecting the bolt heads while providing additional traction to the vehicle and protection to the tire and rim.

In one embodiment, the invention is a supplemental tread device for use with a tire having a tire wall. The supplemental tread device includes a rim defining an inner tire support and a first connection body connected to a bead lock defining an outer tire support and a second connection body to lock the tire in position. The bead lock has a supplemental tread connected to the outer face.

Another embodiment of the present invention includes a bead lock clamp for connection to a tire rim for clamping a tire wall which has a body with an inside lock face for clamping the tire wall and an outside lock face supporting a supplemental tread that covers at least a portion of the outside lock face.

Yet a further embodiment of the present invention includes a bead lock tire rim having an axle distal rim end forming an inner tire support having a tire end with a rounded contact edge and a first connection body defining at least one nut recess.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
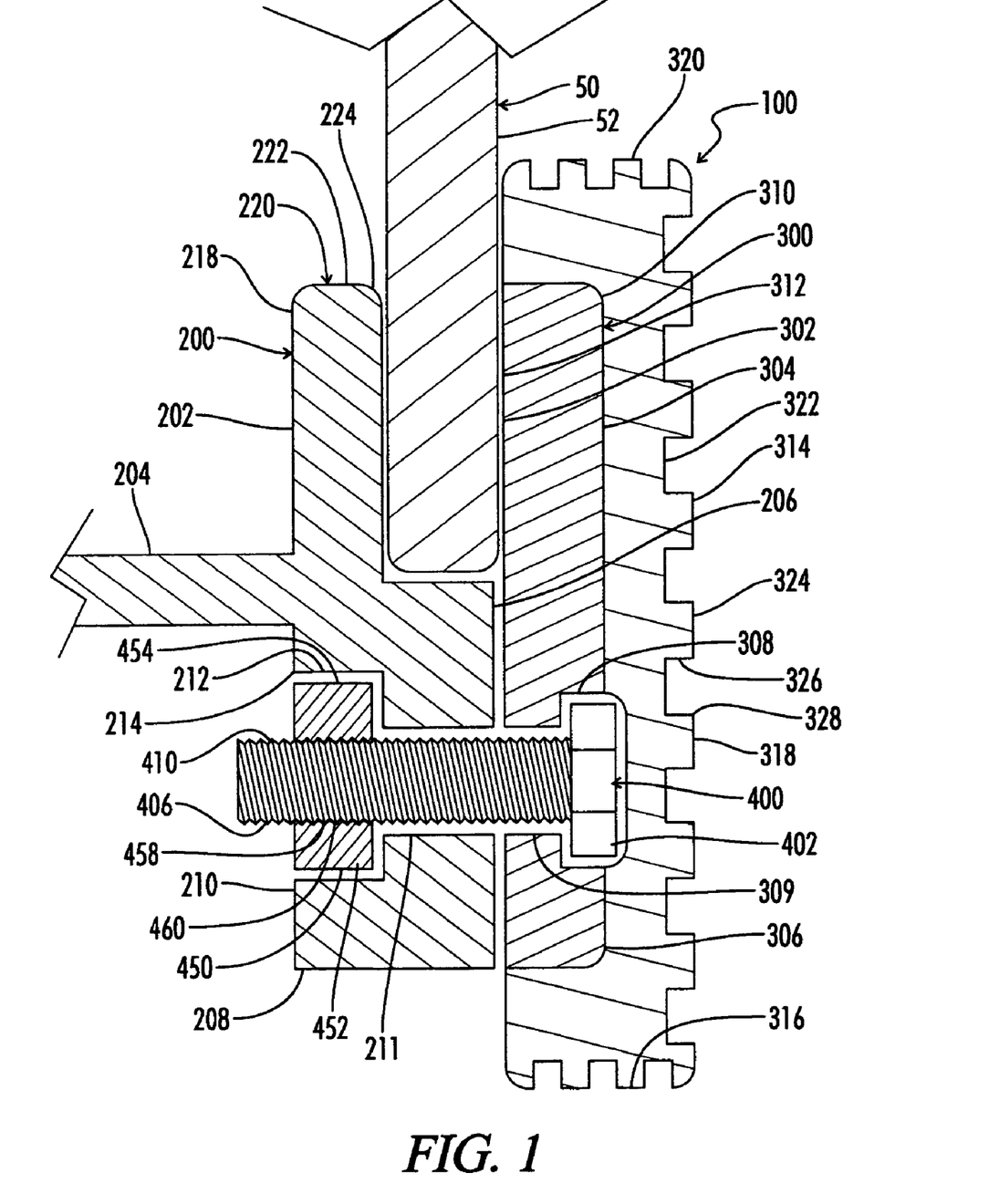
FIG. 1 is a cut away view of the rim, tire, and beadlock assembly.
Figure 3:
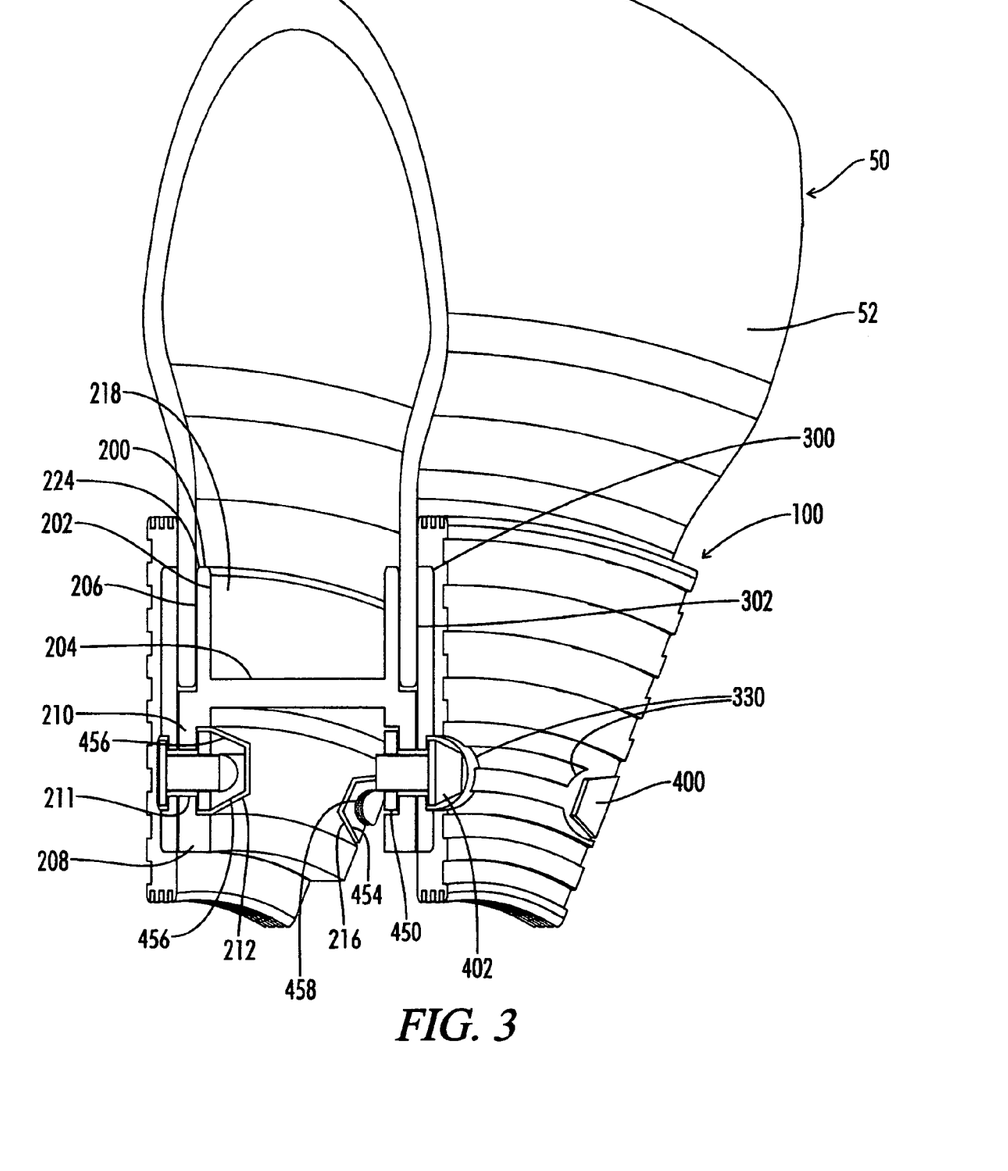
FIG. 3 is an isometric sectional view of the bead lock mounted to connect a tire to the rim with bolt head recesses in the supplemental tread and faceted nut apertures in the rim section.
Figure 4:
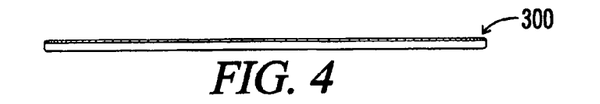
FIG. 4 is a top view of the supplemental tread bead lock.
Figure 5:
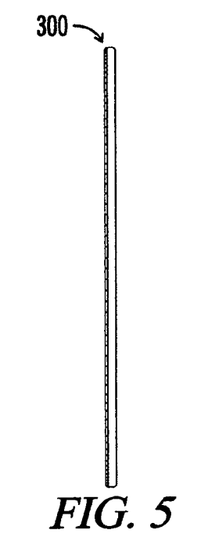
FIG. 5 is a right side view of the supplemental tread bead lock.

As shown in FIGS. 1, 2, and 3 of the drawings, one exemplary embodiment of the supplemental tread apparatus 100 present invention is used to lock a tire 50 with a tire wall 52 for use in low pressure rough treatment situations. While the present invention discloses a double bead lock design, it is envisioned that a single side bead lock may be utilized.

The supplemental tread apparatus 100 includes the basic components of a rim 200, a bead lock 300, and a connection bolt 400.

As shown in FIGS. 1, 2, and 10-16, the rim 200 includes an inside rim face 202 connected to a spanning web 204 that connects across the rim to the other side of the rim 200. The inside rim face 202 connects across an axle distal rim end 218 to the an outside rim face 206. The axle distal rim end 218 forms an inner tire support 220 for capturing the tire wall 52 with a tire end 222 having a rounded edge 224 for support the tire wall 52 when it is bent over the rounded edge 224 of the inner tire support 220. This rounded edge 224 become import in extreme four wheeling situations such as that shown in FIG. 2 where the tire wall 52 is squeezed between the inner tire a support 220 and the exterior rock 60. This rounded edge 224 keeps the tire from cut or compromised by the inner tire support 220. Prior art designs tended to have square or even pointed edges which cut the tire wall during these situations.

Continuing in a clockwise manner, the outside rim face 206 leads down to the axle proximate rim end 208 having the first connection body 210. The first connection body 210 differs from the prior art by utilizing a shank aperture 211 connecting to a nut recess 212 on the inner side of the first connection body 210. Previous design used threaded tapped holes directly in the rim for this connection. This causes problems on the trail when the bolt head 402 sheers off from the shank 406 or the shank 406 pulls loose from the rim. This ruins the ability to provide a quick fix because either the remaining shank 406 must be unthreaded from the rim or the entire rim must be replaced. In contrast to this prior art, the configuration of the present invention allows for the bolt 400 to simply be punched out of the bolt aperture 211 and a replacement bolt 400 to be inserted. Additionally the nut recess 212 may use a rounded recess 214 so that different sized nuts and bolts can be utilized, or the preferred embodiment's faceted recess 216 may be used so that the nut is rotationally held to the rim so that only an exterior wrench is needed to tighten the bolt 400.

FIGS. 1-9, and 3 show the improved a bead lock 300 of the present invention. The bead lock 300 includes an inside lock face 302 and an outside lock face 304 connected by an axle proximate lock end 306 and an axle distal lock end 310. A second connection body 308 is formed at the axle proximate lock end 306 and defines a bolt aperture 309 for passage of the bolt shank 406 through the bead lock 300. The axle distal lock end 310 forms an outer tire support 312 having a supplemental tread 314 with an axle distal tread face 320 to reduced the pressure that is directly applied to the tire wall 52. Similarly, an axle proximate tread end 316 is provided on the axle proximate lock end 306 to protect the axle proximate end of the rim 200.

Figure 6:
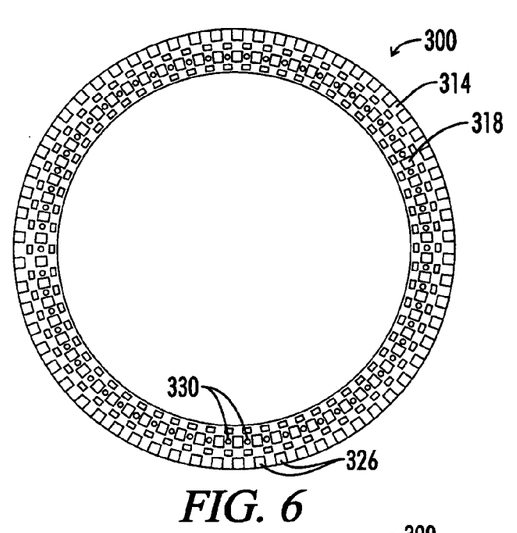
FIG. 6 is a front view of the supplemental tread bead lock.
Figure 7:
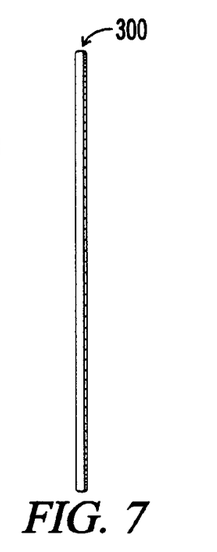
FIG. 7 is a left side view of the supplemental tread bead lock.
Figure 8:
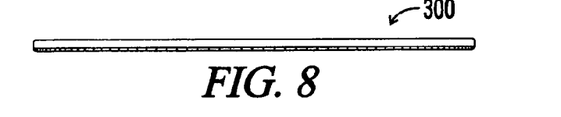
FIG. 8 is a bottom view of the supplemental tread bead lock.
Figure 9:
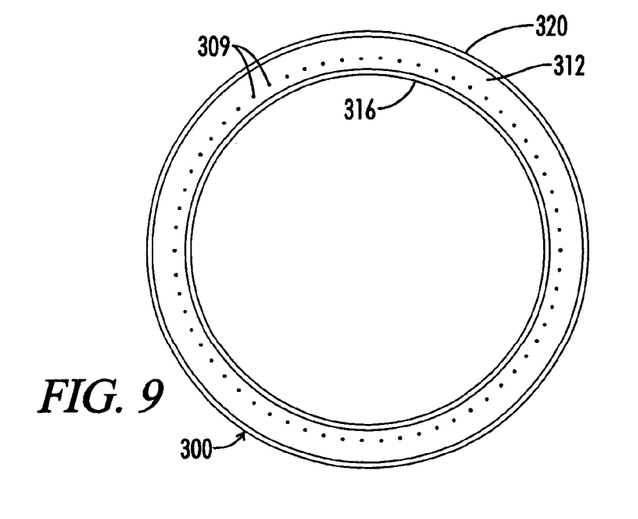
FIG. 9 is a back view of the supplemental tread bead lock.
Figures 10, 11, 12, 13, 14:
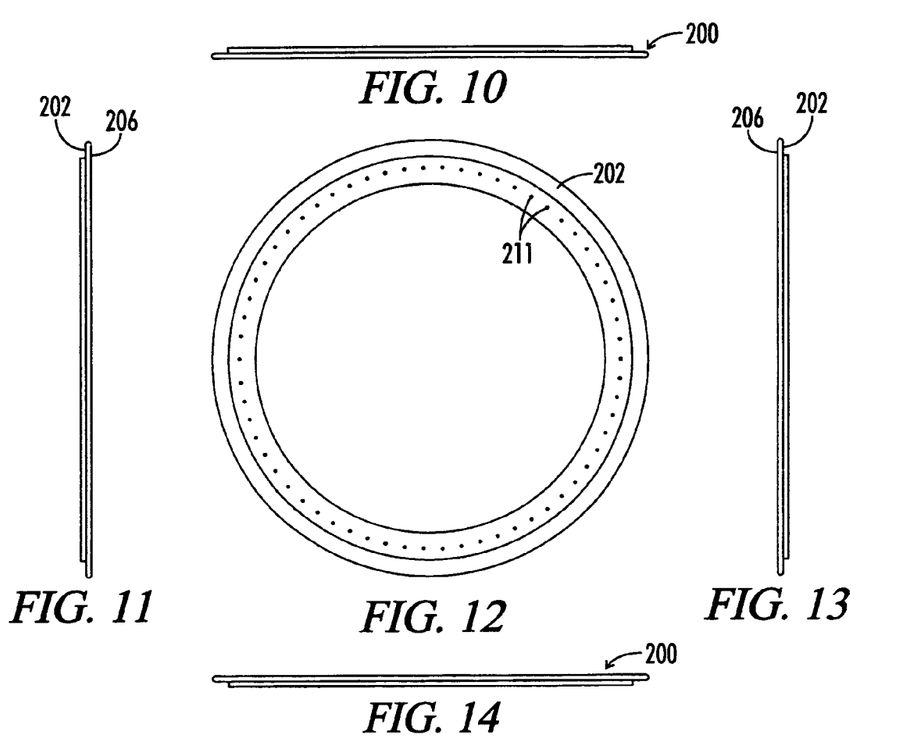
FIG. 10 is a top view inside rim face that is used in forming a tire rim for connection of the supplemental bead lock.
FIG. 11 is a right side view of the rim face.
FIG. 12 is a front view of the rim face.
FIG. 13 is a left side view of the rim face.
FIG. 14 is a bottom view of the rim face.
Figure 15:
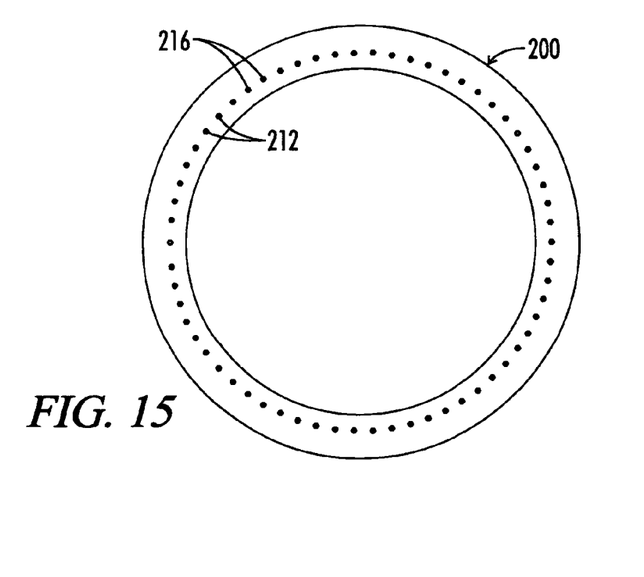
FIG. 15 is a back view of the rim face.
Figure 16:
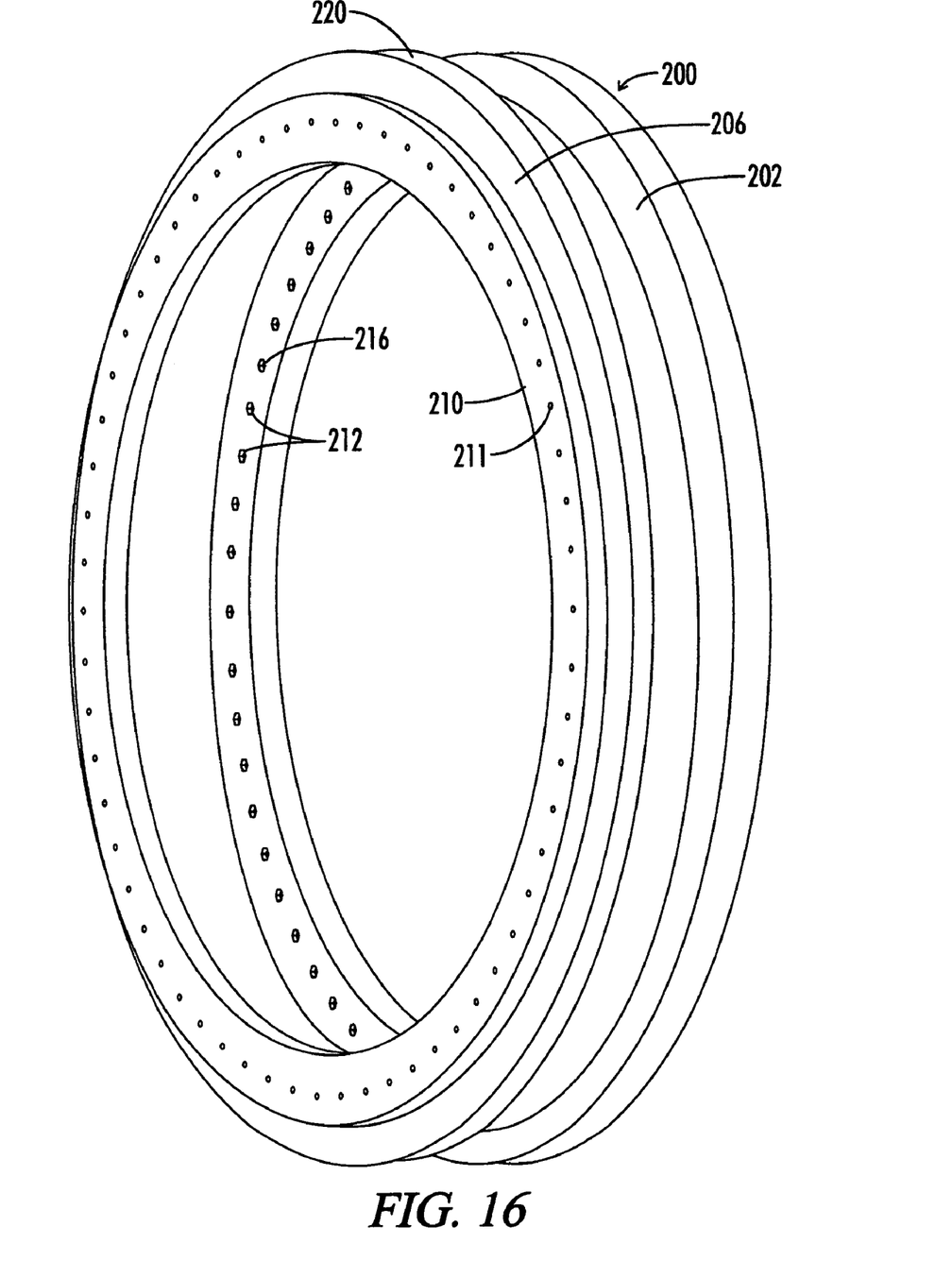
FIG. 16 is an isometric view of the rim face mounted on the inside and outside of a rim.

As best seen in FIG. 3, the outside lock face 304 is covered by an outer tread face 318 with a treaded pattern forming tread recesses 322 and tread extensions 324 for increased effectiveness in extreme conditions. FIG. 3 shows a circular tread pattern for use where some slippage may be desirable and FIG. 6 shows a lug type of pattern with tread lugs 326 and sharp edges 328 for use where an increased lug grip may be desirable. Thus, the tread pattern on the supplemental tread may be varied for different scenarios. Bolt head apertures 330 are provided for recessing the bolt head 402 into the tread pattern for additional protection so that the edges of the bolt head 402 don't get rounded off during extreme use situation.

As noted by FIGS. 1, 2, and 3, the bead lock 300 is clamped to the rim 200 by multiple connection bolts 400 having a bolt head 402 with a head thickness 404 that is preferably less than the supplemental tread thickness. The bolt 400 has a bolt shank 406 having a shank length 408 and threads 410 appropriate to the application. The bolt 400 is adapted to connect into a connection nut 450 that has a faceted nut body 452 with an external rim 454 having facets 456 that mate to the faceted aperture 216 on the rim 200. The nut 450 defines a central aperture 458 with threads 460 appropriate for mating to the threads 410 on the bolt shank 406.

Figure 17:
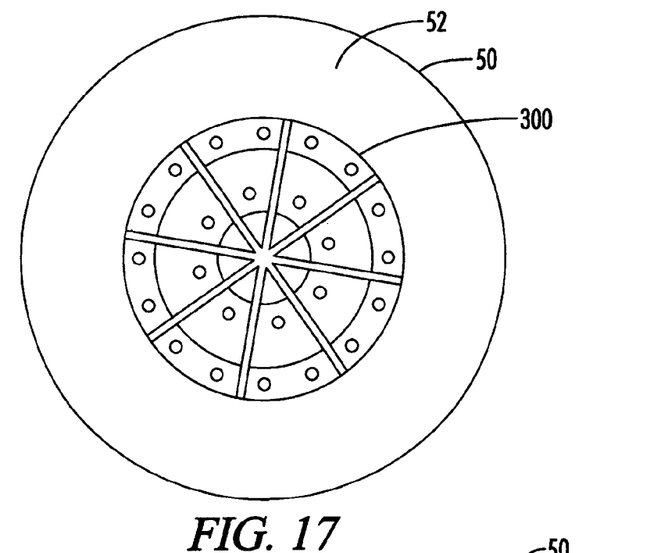
FIG. 17 is a side view of a rim using an extended paddle bead lock.
Figure 18:
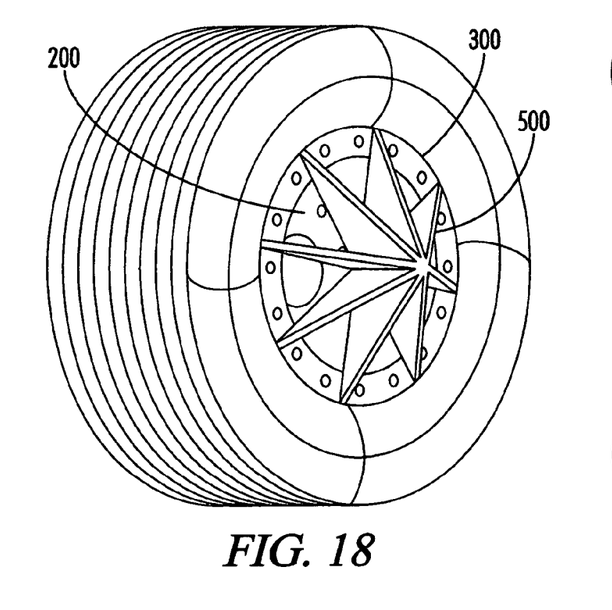
FIG. 18 is an isometric view of the extended paddle bead lock.
Figure 19:
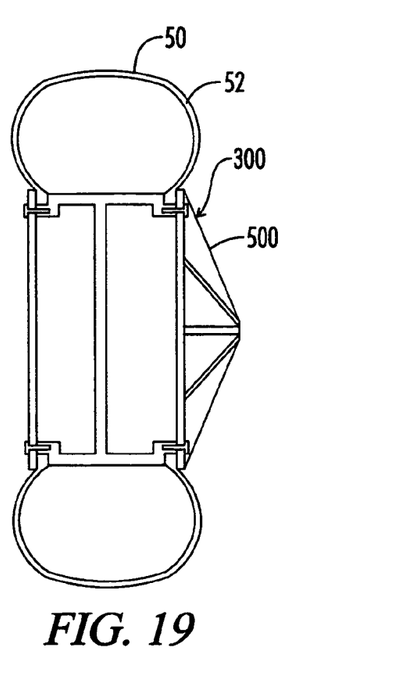
FIG. 19 is a cutaway view of the tire of FIG. 16 showing the paddle extensions pushing beyond the tire sidewall.
Figure 20:
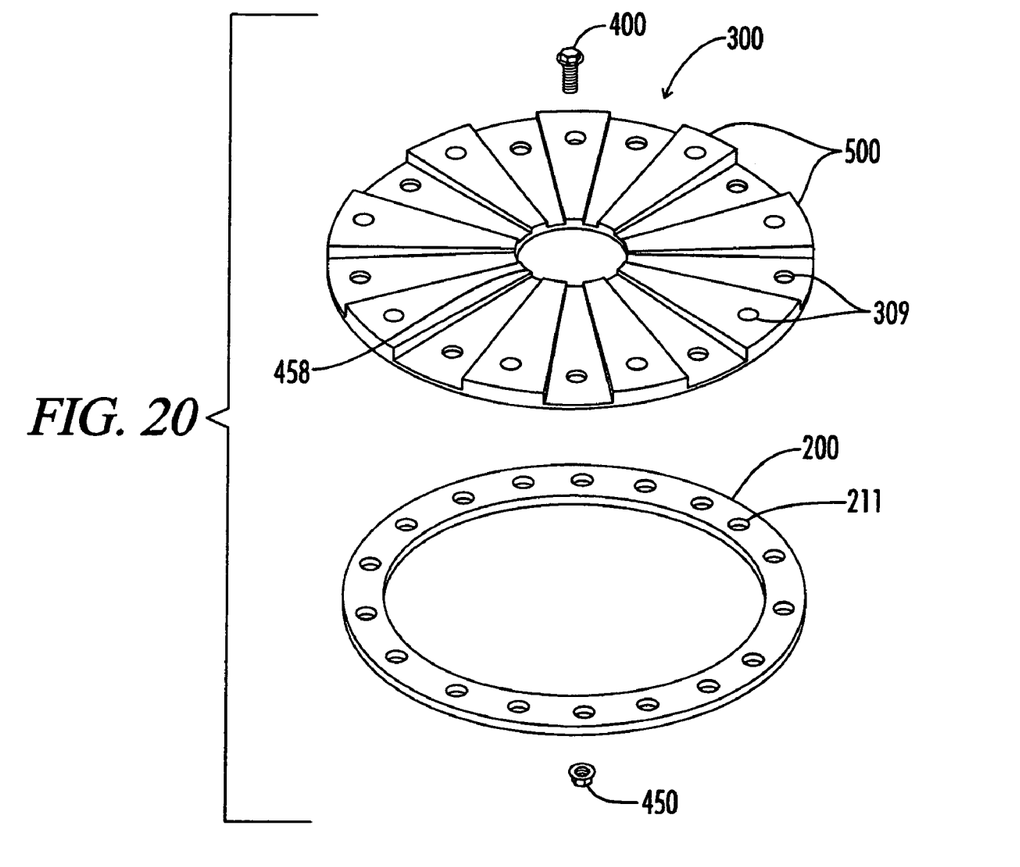
FIG. 20 is an exploded view of an extended paddle bead lock and the rim ring.
Figure 21:
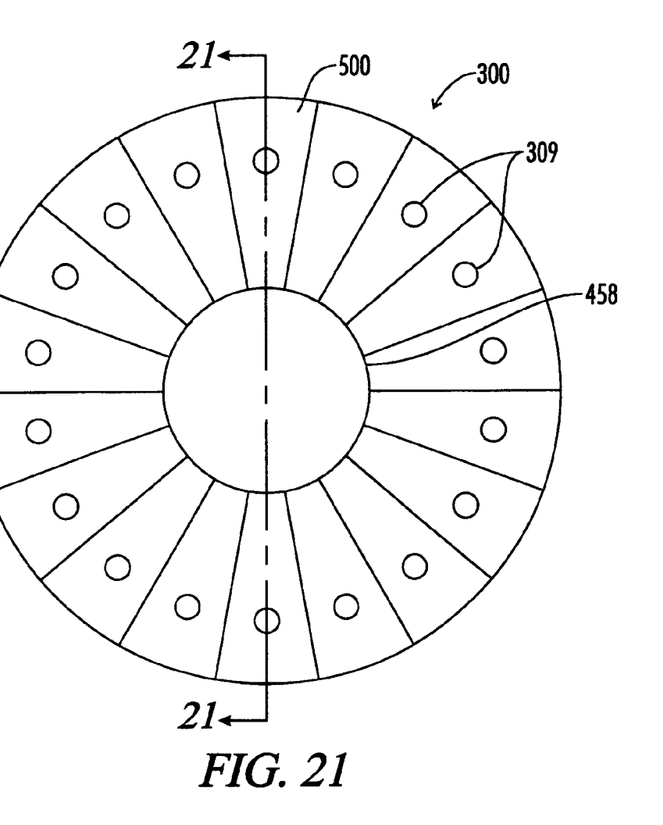
FIG. 21 is a front view of the extended paddle bead lock.
Figure 22:
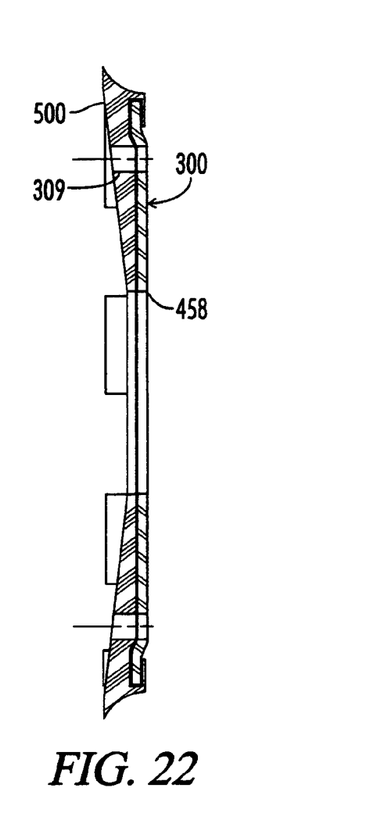
FIG. 22 is a sectional view of the extended paddle bead lock along line A-A of FIG. 21.
Figure 23:
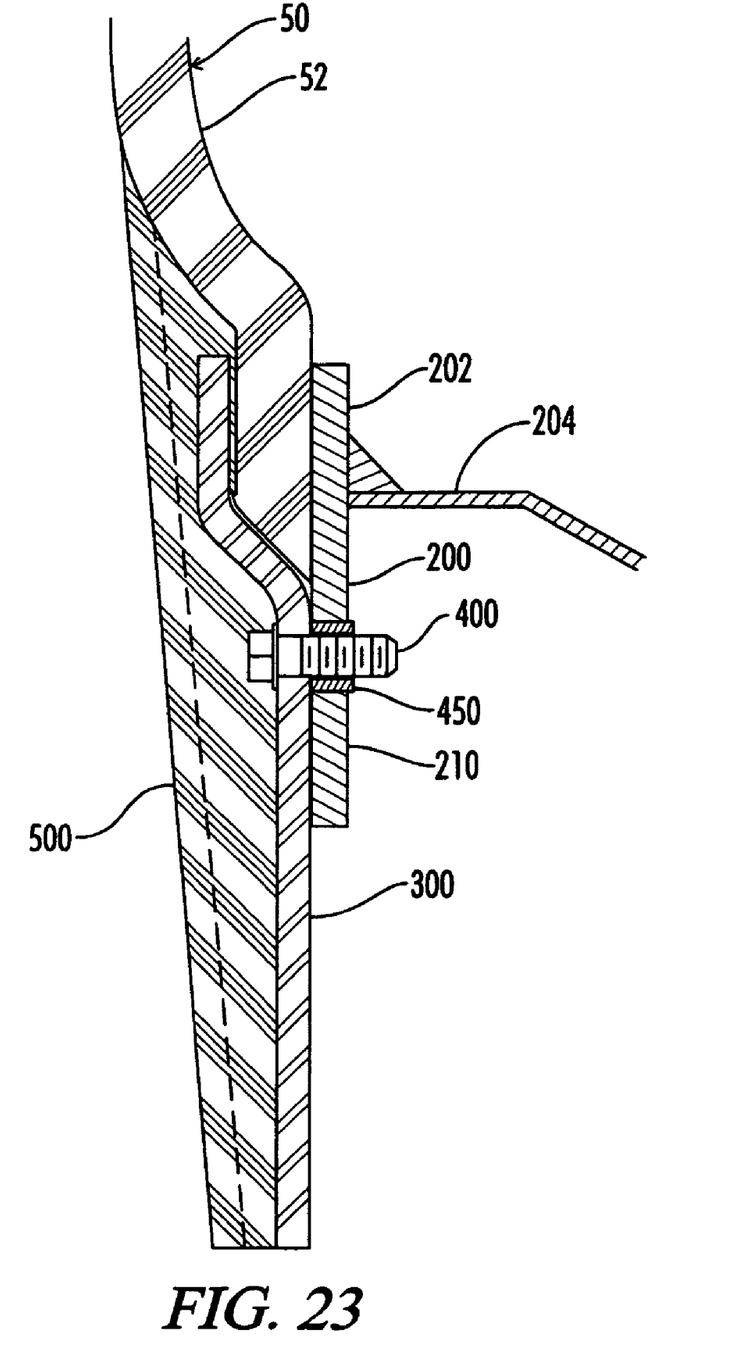
FIG. 23 is a cut away view of the rim, tire, and extended paddle bead lock assembly.

FIGS. 17, 18, and 19 show a rim using an extending center extended paddle bead lock 300. The bead lock 300 is similar to that previously described with the addition of shaped extensions 500 that are used as the supplemental tread 314. In the preferred embodiment shown, the shaped extensions 500 are made from the same compound as the bead lock 300 and are welded to the outside lock face 304 and cross over the open center of the bead lock 300 in a star type of arrangement with mirror image shaped offset sides in relation to the axle line to provided for balancing the assembly. The open center allows access to the bolts for installing the rim on the vehicle. The shaped extension's 500 shape may vary according to the application of the assembly 100. The shaped extensions 500 provide additional traction and protection to the vehicle and may be constructed from any suitable material such as metals, rubbers, synthetics, polymers, etc. The preferred embodiment is constructed from aluminum and has the triangular shape shown in the drawings. Other shapes may be utilized. A block type shape is useful for rock crawling applications. For deep water racing such as that associated with swamp buddy racing, these may be formed in a paddle wheel configuration or a curved pattern similar to a turbine or propeller to allow for additional motivating force for the vehicle. As shown in the preferred embodiment of FIGS. 18 and 19, the shaped extensions 500 extend past the sidewall of the tire to prevent side damage to the rim or tire while providing an increased traction surface for the tire to contact obstacles for additional traction. Note that the shaped extensions 500 should not be construed as being limited to the interior rim portion of the tire, but can extend distally over the sidewall of the tire such as is known in the prior art to provide sidewall protection and auxiliary weight carrying rims for emergency situations.

FIGS. 20-23 show another embodiment of as an extending edge version of an extended paddle bead lock 300. The shaped extensions 500 are thicker for more strength and impact resistance and the extension has been reduced for less leverage on rim. Once again, the open center allows access to the bolts for installing the rim on the vehicle. The shaped extension's 500 shape may vary according to the application of the assembly 100. The shaped extensions 500 provide additional traction and protection to the vehicle and may be constructed from any suitable material such as metals, rubbers, synthetics, polymers, etc.

Reference numerals used throughout the detailed description and the drawings correspond to the following elements:
a tire 50
a tire wall 52
rock 60
A supplemental tread apparatus 100
a rim 200
an inside rim face 202
a spanning web 204
an outside rim face 206
an axle proximate rim end 208
a first connection body 210
shank aperture 211
nut recess 212
rounded recess 214
faceted recess 216
an axle distal rim end 218
an inner tire support 220
a tire end 222
a rounded edge 224
a bead lock 300
an inside lock face 302
an outside lock face 304
an axle proximate lock end 306
a second connection body 308
bolt aperture 309
an axle distal lock end 310
an outer tire support 312
a supplemental tread 314
an axle proximate tread end 316
an outer tread face 318
an axle distal tread face 320
tread recesses 322
tread extensions 324
tread lugs 326
sharp edges 328
bolt head apertures 330
a connection bolt 400
bolt head 402
head thickness 404
bolt shank 406
shank length 408
threads 410
a connection nut 450
nut body 452
external rim 454
facets 456
central aperture 458
threads 460
shaped extensions 500

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures.

What is claimed is:

1. A supplemental tread apparatus for use with a tire having a tire wall, the apparatus comprising:
a rim defining an inner tire support and a first connection body defining a shank aperture;
a bead lock defining an outer tire support and a second connection body, the bead lock defining an axle proximate lock end, an axle distal lock end, and a bolt aperture positioned between the axle proximate lock end and the axle distal lock end at the second connection body, the second connection body adapted to connect to the first connection body to lock the tire in position, the bead lock having an outer face;
a removable bolt having a bolt head larger than the bolt aperture, a bolt shank sized to pass through the bolt aperture and the shank aperture;
a removable nut having a nut body sized to connect to the shank, the nut body larger than the shank aperture, wherein the nut and bolt are separate from the rim and bead lock so as to be replaceable; and
a supplemental tread connected to the outer face, the supplemental tread extending past the bolt head and defining bolt head apertures for accessing the bolt head, whereby the bolt head is protected while still providing access for replacement of the bolt.

2. The apparatus of claim 1, the inner tire support comprising:

a tire end defining a rounded edge adapted to support the tire wall.

3. The apparatus of claim 1, the rim having an outside face wherein the supplemental tread protects the outside face of the rim.

4. The apparatus of claim 1, wherein the supplemental tread protects the inner tire support by radially extending past the inner tire support.

5. The apparatus of claim 1, the wherein at least a portion of the supplemental tread is connected to the axle distal lock end.

6. The apparatus of claim 1, wherein at least a portion of the supplemental tread is connected to the axle proximate lock end.

7. The apparatus of claim 1, wherein the supplemental tread protects the at least one removable bolt.

8. The apparatus of claim 1, the first connection body defining at least one nut recess.

9. The apparatus of claim 1, the first connection body defining at least one rotational control nut recess.

\* \* \* \* \*